Figure 1:
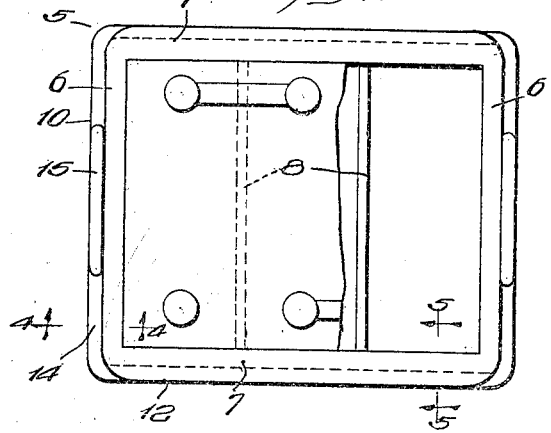

Feb. 23, 1926.

W. H. DUGGAN

BATTERY CELL AND HANDLE

Filed Feb. 9, 1925

1,573,922

2 Sheets—Sheet 1

Witnesses:

Inventor:
William H. Duggan

Feb. 23, 1926.
W. H. DUGGAN
BATTERY CELL AND HANDLE
Filed Feb. 9, 1925
1,573,922
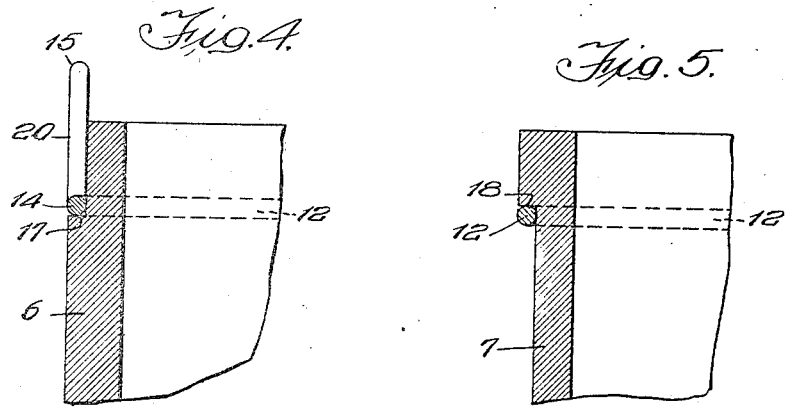
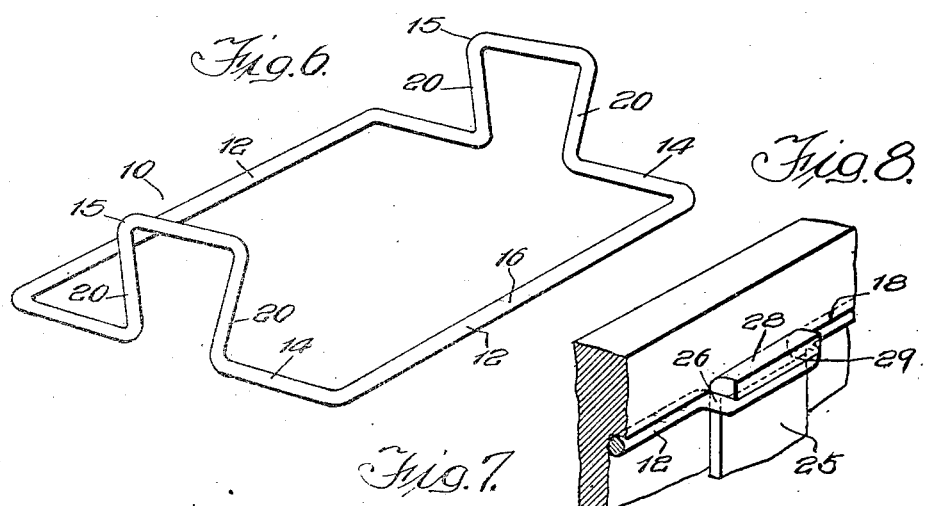
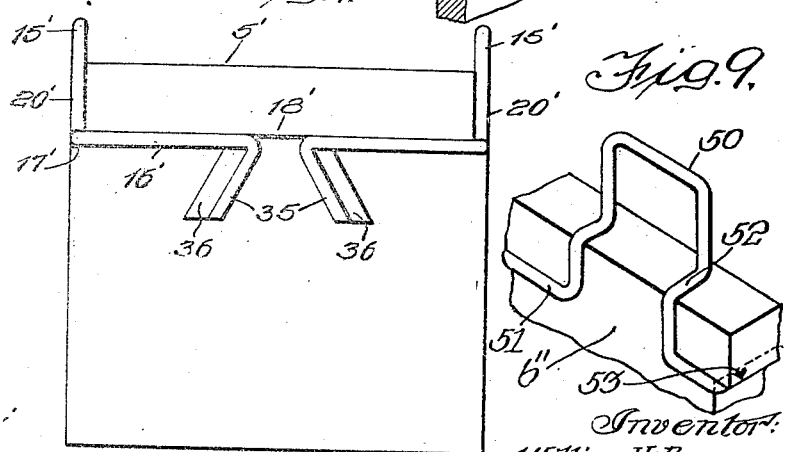

Patented Feb. 23, 1926.

1,573,922

UNITED STATES PATENT OFFICE.

WILLIAM H. DUGGAN, OF CHICAGO, ILLINOIS, ASSIGNOR OF ONE-HALF TO BENJAMIN CLARKE, OF CHICAGO, ILLINOIS.

BATTERY CELL AND HANDLE.

Application filed February 9, 1925. Serial No. 7,777.

*To all whom it may concern:*

Be it known that I, WILLIAM H. DUGGAN, a citizen of the United States, residing at Chicago, in the county of Cook and State of Illinois, have invented a certain new and useful Improvement in Battery Cells and Handles, of which the following is a full, clear, concise, and exact description, reference being had to the accompanying drawings, forming a part of this specification.

My invention relates to container and handle means for storage batteries and the like.

I have pointed out in my co-pending application, Serial No. 724,952, filed July 9, 1924, that storage batteries for motor vehicles and similar service have comprised wooden boxes in which were placed individual containers for each cell, whereas the practice more recently has been to embody all the structure in one single integral unit of composition. The difficulties in providing handles on these integral structures, their liability to breakage, and the practical impossibility of replacement have already been set out in my above referred to application.

In an effort to overcome these difficulties, combination attachments and handle means have been provided for ready attachment and replacement without disturbing the container or its contents. Such of these as have been provided, however, have required the insertion of rivets, screws, bolts, or the like, or the use of nuts, or other fastening means in attaching the device to the battery container. This has placed a rather difficult task upon the person arranging the device upon the battery, and especially where several points of connection about the band or strap are required the device becomes expensive, and in distribution a number of different parts must be furnished.

According to my present invention I eliminate the necessity for making connections or attachments upon arranging the device upon the battery. The resulting structure is more simple and less expensive than the provisions heretobefore made, and the elimination of all connections or attachments in placing the device upon the battery permits the same to be distributed independently of the battery and arranged thereon without special tools or skill.
I form the bail of spring metal and form an offset bight therein which performs the dual function of providing a handle and of freeing opposite sides of the bail so that they may be conveniently sprung upon the battery. I provide downwardly and upwardly facing shoulder means on the battery, and by arranging the upwardly facing shoulder means along the part of the bail which is offset, and the downwardly facing shoulder means along the parts which are freed thereby. A tensioning action is provided in one direction and a spreading action generally normal thereto, so that the device may be sprung over the top of the battery and when in place, a firm and sturdy handle is provided. I also provide for holding the battery down through the combination handle and bail means, where desired.

Figure 2:
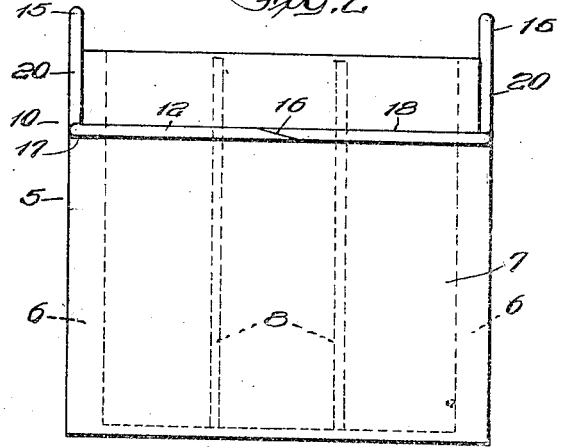
Figure 3:
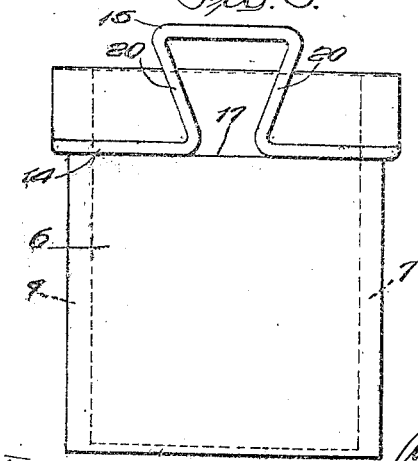

In the drawings:
Figure 1 is a top plan view of a battery embodying the present invention;
Fig. 2 is a side elevational view of the same;
Fig. 3 is an end view;
Fig. 4 is a detail vertical section on line 4—4 of Fig. 1;
Fig. 5 is a detail vertical section on line 5—5 of Fig. 1;
Fig. 6 is an isometric view of the bail and handle means shown in Figs. 1, 2, 3, 4 and 5;
Fig. 7 is a side elevational view showing another form of bail and handle means embodying the invention;
Fig. 8 is a fragmentary isometric view of a portion of one side of the battery container and bail of Fig. 1, showing one manner of holding the battery down through the bail; and Fig. 9 is a fragmentary isometric view of another modification.

The particular battery shown comprises a case or container 5 having end walls 6, side walls 7, and dividing partitions 8, all of which are usually molded of a composition material into an integral unitary structure. The battery cells are installed in the compartments provided by the partitions 8, and their terminals may be connected as shown or in any other suitable manner.

The handle means of Figs. 1 to 6 comprises a bail 10 which I form of spring metal. This bail may be formed of a rod of circular cross section or otherwise, as desired. The bail 10 is shaped into an open rectangular figure, conforming generally to the periphery of the container 5. It has side portions 12 which lie along the side walls 7 and end portions 14 which lie along the end walls 6 when the device is in place upon the battery. The end portions have offset bights 15 which serve the dual function of providing handles and freeing the side portions 12 for spreading into place, as will be pointed out.

The ends of the band forming the bail 10 may be closed or secured together, as by welding at 16, for example, in the manufacture of the device. An endless bail is thereby produced and opening all connections and attachments after installation upon the battery are eliminated. The bail and handle means produced is in one piece and the necessity of keeping several pieces together in distribution and use is avoided.

For interlocking engagement with the bail, the battery has oppositely facing shoulders 17 and 18. While the particular shoulder means may be varied, that shown provides a particularly novel co-operation with the present bail and handle. The upwardly facing shoulders 17 are on the end walls 6 along the end portions 14 of the bail, which end portions need not, therefore, be spread apart because the reduced part of the container in that direction is at the top and the bail may be slipped over the ends or length of the container without spreading, the shoulders 17 limiting the downward movement of the bail over the container. As already pointed out, the handle forming bights 15, in addition to their handle forming function, free the side portions 12 so that they may be spread apart. The downwardly facing shoulders 18 may, therefore, be on the side walls 7 because the bights 15 adapt the bail for spreading in that direction, so that it may be sprung over the greater width of the container above the shoulders 18, and upon coming into engagement with the shoulders 17 will spring in beneath the shoulders 18 to lie between said shoulders and the shoulders 17 which are spaced vertically therefrom, sufficiently to receive the bail between them.

The bights 15 with the springiness of the bail permit it to be sprung into place upon the battery, and the uninterrupted side portions 12 tension the bail snugly and tightly about the container. The side portions 20 of the bights 15 are preferably spread upwardly as shown, so that the bail will be tensioned about the container by any downward force or stress on the bights, as well as by any upward force or stress thereon, and loosening of the bail by a downward pull on the bights is avoided. The spreading of the bights is shown as of generally dove-tail formation, but it is to be understood that the bights may be shaped differently for the same purpose.

To hold the battery down and against accidental displacement, when in place in the vehicle, it is customary to employ hold downs. For holding the battery down with my improved bail and handle I propose to anchor straps 25 (Fig. 8) on the vehicle, one to extend upwardly along each side of the battery and to receive the battery between them. Then by horizontally offsetting the intermediate portion of each side 12 of the bail outwardly slightly at 26, the straps 25 may, in mounting the battery between them, be sprung through the offset 26 and between the sides of the battery and the adjacent side portions of the bail. The upwardly projecting end 28 of the strap may then be rolled over, at 29 or a suitable bracket attached for abutting the offset 25 and thereby holding the battery down and firmly in place.

Where I have referred to the side and end portions of the bail, it is to be understood that these are merely relative terms and the handles could be on opposite sides instead of on the ends, should that be desirable. The band or bail is closed, preferably in the manufacture, so that the band as distributed is of endless form. The bail may be distributed with or independently of the containers and simply sprung in place thereon when desired. Projections are thereby eliminated and a high degree of compactness may be secured in packing and shipping, also the device being simply sprung in place afterwards, the possibility of breaking off or distorting the handle portions thereof in shipment is avoided.

In Fig. 7 I have shown a multiple, specifically a two-piece bail embodying my present invention. In this case, as before, each bail part is sprung in place and held without making connections or attachments after arranging them upon the battery. The upwardly and downwardly facing shoulders are indicated at 17' and 18' as before and the end portion of each bail part is again provided with a bight 15' which again serves the dual function of providing a handle and freeing the sides 16' to permit them to be spread in place upon the battery. In this case, however, the sides 16', instead of extending continuously, are separated and the free ends are turned down at 35 and preferably spread downwardly slightly to engage over shoulders or lugs 36 on the side walls 7 of the battery intermediate the ends thereof and below the shoulders 18'. The engagement of the ends 35 over the lugs or shoulders 36 holds the bail parts against endwise displacement from the battery. I have shown the free ends of the downturned portions 35 as terminating approximately at the bottom of the lugs 36, but it is to be understood that these ends may encircle the sides and bottom of the battery and be connected or joined together, forming in effect two endless bail and handle parts.

In the embodiments shown, the shoulders 17 and 18 extend continuously along the sides and ends of the battery container, but it will be obvious that isolated lugs at spaced points may be provided for the same purpose. It is to be understood that the union between the ends of the first embodiment need not show, after completion, and that the bail may be coated or finished as desired.

In the embodiment shown in Fig. 9 I provide for omitting the shoulder means on the end walls 6" of the container by offsetting the handle forming bight 50 of the bail 51 inwardly at 52 into engagement with the upper surface or edge of the container 5". This holds the bail in place against downward movement and the opposite sides of the container are provided, as before, with downwardly facing shoulders 53 which hold the bail against upward movement and through which the lifting effort is applied to the battery.

For the purpose of teaching the invention to those skilled in the art, I have referred to certain embodiments of the same, but it is to be understood that I do not intend to be limited to the precise details shown or described except as set out in the appended claims.

I claim:

1. In combination, a battery container having downwardly facing shoulder means thereon, said shoulder means being interrupted about the container, a band having handle means thereon and spreadable portions along said shoulder means adapted to be sprung over said shoulder means into position therebeneath and upwardly facing abutment means on the container along the interrupted part of said first shoulder means for limiting the movement of the band onto the container.

2. In combination, a battery container having downwardly facing shoulder means thereon, said shoulder means being interrupted about the container, upwardly facing shoulder means on the container along the interrupted part of said first shoulder means, a band having spreadable portions along said first shoulder means adapted to be sprung thereover and into position between said first and second shoulder means and a bight in the portion of said band extending along said second shoulder means for permitting spreading over said first shoulder means and forming a handle on the band.

3. In combination, a battery container having downwardly facing shoulder means thereon, said shoulder means being interrupted about the container, upwardly facing shoulder means on the container along the interrupted part of said first shoulder means, a band having spreadable portions along said first shoulder means adapted to be sprung thereover and into position between said first and second shoulder means and a bight in the portion of said band extending along said second shoulder means for permitting spreading over said first shoulder means and forming a handle on the band, said bight being formed to increase the tension in the band about the container and the grip of it thereon with a downward or upward stress upon the bight.

4. In combination, a battery cell, shoulders on the walls of said cell, a spring metal bail adapted to be sprung into engagement with said shoulders and into position encircling said cell and handle means on said bail.

5. In combination, a battery container having shoulders on the walls thereof, a band adapted to encircle the container and engage between the shoulders thereon and a bight in the said band, said bight forming a gap in the band when same is in its normal position on the container and said gap being diminished and the band contracted about the container by upward and downward stresses imposed upon said bight.

6. In combination, a battery container having shoulders on the walls thereof, a band adapted to encircle the container and engaged between the shoulders thereon, and a dove-tail bight in said band, said bight having its restricted portion opening into the band and forming a gap in the band when same is in its normal position on the container with the band on opposite sides of said gap spaced apart.

7. In combination, a battery container having upwardly and downwardly facing shoulder means thereon, a handle having a spring band adapted to be spread over said downwardly facing shoulder means and into position upon the container between said downwardly and upwardly facing shoulder means, said downwardly facing shoulder means being formed to permit said springing of said band therepast.

8. In combination, a container having side and end walls, a bail having side portions for embracing the side walls of said container and a connecting portion lying along the end wall, said bail being formed of spring metal, a bight in said connecting portion, said bight forming a handle and separating opposite sides of said connecting portion to permit spreading the side portions and oppositely facing shoulders on the container for receiving said bail between them.

9. In combination, a battery container, downwardly facing abutment means on said container, a band placed upon the container by spreading over said downwardly facing abutment means, and means for limiting the movement of said band onto the container.

10. In combination, a battery container, means on said container for limiting downward movement of a handle band upon the container, means for limiting upward movement of the band, and a handle band spreadable over said upward movement limiting means and held between said upward and downward band movement limiting means.

In witness whereof, I hereunto subscribe my name this 5th day of February, 1925.

WILLIAM H. DUGGAN.